United States Patent [19]

McKewan

[11] 4,258,607
[45] Mar. 31, 1981

[54] VIBRATION RESISTANT SCREW

[75] Inventor: Arthur J. McKewan, Rochester, Mich.

[73] Assignee: Microdot Inc., Darien, Conn.

[21] Appl. No.: 79,975

[22] Filed: Sep. 28, 1979

Related U.S. Application Data

[63] Continuation of Ser. No. 903,903, May 8, 1978, abandoned.

[51] Int. Cl.³ .................... F16B 25/00; F16B 39/30
[52] U.S. Cl. .................................. 411/417; 411/413; 411/2
[58] Field of Search .................... 85/47, 48, 46, 41; 151/14 R

[56] References Cited

U.S. PATENT DOCUMENTS

| | | | |
|---|---|---|---|
| 2,035,055 | 3/1936 | Dyer | 151/14 R X |
| 2,263,424 | 11/1941 | Langer | 85/47 |
| 2,278,411 | 4/1942 | Braendel | 85/47 X |
| 2,636,194 | 4/1953 | Schneider | 151/14 R X |
| 2,823,574 | 2/1958 | Rosan | 85/47 |
| 2,901,019 | 8/1959 | Schweppe | 85/47 X |
| 3,469,491 | 9/1969 | Munsey | 85/47 |
| 3,504,722 | 4/1970 | Breed | 85/47 X |
| 3,524,378 | 8/1970 | Wieber | 85/47 |
| 3,665,801 | 5/1972 | Gutshall | 85/41 |
| 3,707,107 | 12/1972 | Bieri | 85/46 X |
| 4,022,099 | 5/1977 | Ballantyne | 85/41 X |
| 4,023,914 | 5/1977 | Holmes | 85/47 X |
| 4,076,064 | 2/1978 | Holmes | 151/14 R |

Primary Examiner—Rodney H. Bonck
Attorney, Agent, or Firm—Harness, Dickey & Pierce

[57] ABSTRACT

The shank of a self tapping screw has a thread forming section, a threaded section, and a reduced diameter section interconnecting the forming and threaded sections. The thread forming section forms internal threads into a known thread form that has a wedge ramp at its root. The threaded section comprises threads of standard form having the same pitch as the thread forming section. The reduced diameter section is slightly longer than an integer multiple of the pitch so that the threaded section is backset slightly from the forming section.

12 Claims, 3 Drawing Figures

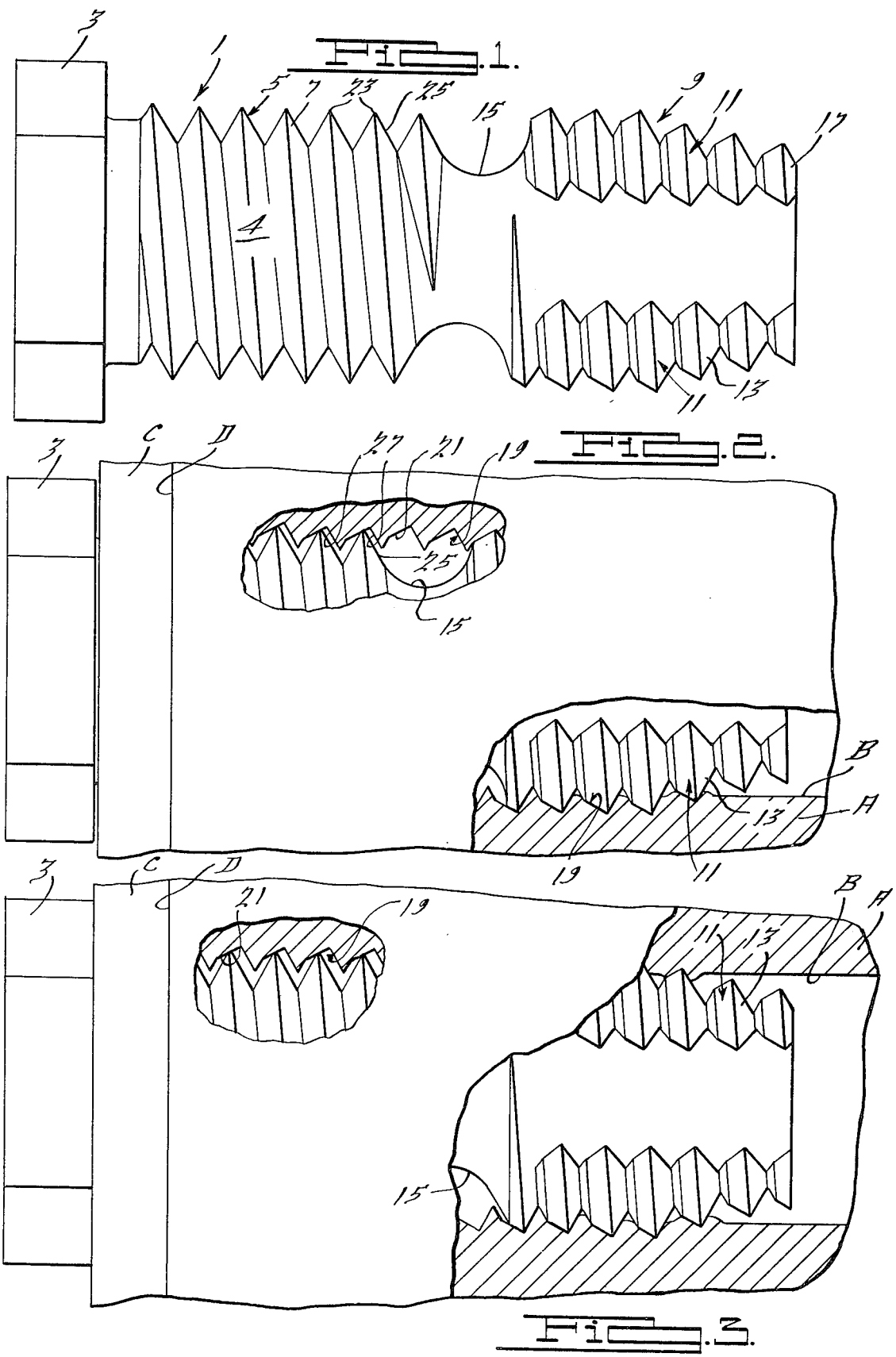

VIBRATION RESISTANT SCREW

This is a continuation of application Ser. No. 903,903, filed May 8, 1978, and now abandoned.

BRIEF SUMMARY OF THE INVENTION

It is the purpose of this invention to provide a self tapping screw that is highly resistant to loosening due to the effects of vibration, fluctuating loads, etc.

The invention accomplishes this purpose by means of a screw construction in which the screw shank has a thread forming section that is shaped to form internal threads of known design having a wedge ramp at the root and also has a threaded section with standard external threads that screw into the internal threads. The internal and external threads have the same pitch. The screw includes a special weakened section that extends between the forming section and the threaded section. This section preferably has a diameter substantially less than root diameter of the threads so that it is more highly stressed by axial loads than the other sections. Its length is np+s where "n" is an integer, "p" is the pitch, and "s" is a very small positive number. As a result of this length the external threaded section is offset backwardly (backset) a slight amount with respect to the internal threads so that the external threads are slightly down the wedge ramp even in the absence of an axial clamping load on the screw. In this condition there is reduced clearance or even some radial pressure on the crests of the external threads tending to generate prevailing torque to resist loosening due to vibration, etc.

DESCRIPTION OF THE DRAWINGS

FIG. 1 is a detail side elevation of a screw (which term includes bolt or other externally threaded fastener) that embodies the invention;

FIG. 2 is a longitudinal section, with parts broken away, through an assembly including the screw of FIG. 1 prior to the application of an axial clamping load; and FIG. 3 is a section similar to FIG. 2 showing the assembly after the application of an axial clamping load.

DESCRIPTION OF THE INVENTION

Referring to FIG. 1, an externally threaded fastener 1 in the form of a self tapping screw has a torque receiving head 3 of suitable construction, shown herein as a hex head, and a shank 4 extending from the head which includes a first section 5 comprising external threads 7 of a standard thread form. At the free end of the shank there is a second section 9 that is constructed in accordance with conventional practice to roll or swage internal threads. Thus, it may comprise circumferentially separated lobes 11 with external threads 13 that are capable of swaging or rolling the inner surface of a hole into internal threads having a shape corresponding to that of the threads 13. The pitch of threads 13 is the same as the pitch of threads 7. The shank 4 also includes a third and reduced diameter section, as compared with the thread root diameters, which extends between sections 5 and 9.

Referring to FIG. 2, a workpiece A has a hole B formed in it which is to be used by threaded fastener 1 to clamp a second workpiece C against the outer surface D of the workpiece A. The hole B may be a blind or a through hole. It extends to surface D and, prior to the insertion of the fastener 1, has a round, cylindrical wall of proper diameter to produce the desired thread size. The section 9 is tapered so that there is a piloting cooperation between its end threads and the hole that enables the screw 1 to be readily inserted into and centered in the hole. Upon the application of torque and axial pressure to the screw head 3 the swaging threads 13 on the lobes 11 gradually form internal threads 19 into the wall B, such internal swaging or rolling of conventional thread forms being known in the art.

The threads 19 have a special configuration that has been recently developed and is now known in the trade. This form features a wedge ramp portion 21 that is formed on a continuous spiral during rolling of the threads 19. Conventionally shaped or standard form mating threads can be used with the wedge ramp threads. This type of thread is shaped and sized so that within a predetermined range of clearances the crest will engage the ramp under axial loading to align the fastener and powerfully resist unintentional loosening. As axial loading is increased, the crest moves further down the ramp.

In accordance with the present invention, some initial "down the ramp" function is obtained by a feature whereby the leading sides 25 of the external threads are spaced away from the adjacent sides 27 of the internal threads. This is achieved by back setting the threads 7 a slight amount with respect to the roll formed threads 13 through control of the length of the reduced diameter section 15. The relationship between the threads of section 5 and those of section 9 in terms of the length of section 15 may be stated as follows: np+s, where "n" is an integer, "p" is the thread pitch, and "s" is a small number such as 5 to 10% of the pitch. For example in a $\frac{3}{8}''$ screw, "n" may be 3, "p" (pitch) may be 0.0625", and "s" may be 0.005". With such a screw the minimum diameter of section 15 may be 0.215". In a screw with this dimensional relationship, the sides 25 of the external threads will be spaced from the adjacent sides 27 of the internal threads by at least approximately 0.005" in the absence of axial clamping loads, as in FIG. 2. When additional torque is applied to head 3 so that clamping takes place, as in FIG. 3, tension begins and increases in the shank 4 to cause it to elongate, the sides 25 will be pulled further away from sides 27, and the crests 23 will ride further down the ramp section 21 to create a very strong centering and holding pressure between the external threads and the internal threads to resist forces tending to loosen the parts. As intended, maximum tensile stress will occur in the reduced diameter section 15 and shank elongation will primarily take place there as will fracture if the load exceeds the capacity of the fastener metal. Because of the thread forming section 9 fracture of section 15 would prevent further axial advancement of the threaded section 5 into the hole B. However, by the time this occurs the threads 7 will have moved far enough down the ramps 21 to obtain the desired holding pressure, something that is accentuated by the initial offset "s". At the other extreme, if there is no shank elongation it will be seen that the backset "s" will make it likely that substantial resistance to loosening ("locking") will be present at minimum torquing and low axial loads by virtue of pressure contact between the crests 23 and ramps 21. If there is no fracture, the thread forming end 9 will provide substantial added resistance to loosening.

The fastener 1 is made of material that is suitable for the intended application. Normally, this will be steel and it is preferred that the fastener 1 be heat treated so that the section 9 is somewhat harder than sections 5 and 15. For example, the steel may be plain carbon or alloy with a carbon content of 0.3-0.4 and heat treated so that section 9 is about Rc 48-50 and section 5 is about Rc 32-36. Section 15 is adequate for the torque required but may be even softer than section 5 to promote initial yielding in it rather than the other sections since it is preferred that it be the section of the screw which elongates the most under axial loads to allow the external threads to move down the ramps. The metal or material of which workpiece A is composed is, of course, soft enough to enable the threads 19 to be readily formed in the wall of hole B.

While the thread swaging section 9 is illustrated as forming threads in a smooth walled hole B of about thread pitch diameter, it is apparent that it could be used to reform threads in a previously threaded hole so that they are changed into the special wedge ramp shape 19.

It is within the scope of the invention to have section 9 in the form of a fluted tap (flutes between lobes 11) to cut threads 19 in the wall of hole B. This may be desirable in cases where the workpiece is too hard or tough to be readily swaged. If the threads are cut the internal space around the screw must be large enough to retain the metal that is cut away, i.e., the chips. The flutes can retain some chips but it will be seen that the space around the reduced diameter section 15 will be rather large and can serve to hold a substantial volume of chips, thereby making thread cutting feasible.

Thus, the invention provides a self tapping screw type fastener which has a shank with a threaded fastening section 5 and a thread forming means 9 coaxial therewith which is interconnected by a weaker section 15 that is related to them in such a way as to enhance resistance to loosening during the functional life of the fastener and create a strong likelihood that fracture, if any, will occur in it rather than any of the threads during assembly. While it has been suggested that as a rule of thumb the length of "s" be about 5-10% of the pitch, it is now apparent that it is related to the permitted thread clearances and to the length (as projected along the axis of the shank) of the wedge ramp 21 at the root of thread 19 and should be materially less than projected axial ramp length. It is presently preferred that it be in the range of about 10-20% of such length.

It is apparent that if the fastener 1 is removed from the hole B for any reason another fastener having standard external threads may be used to mate and "lock" with internal threads 19.

Various modifications may be made in the specific details described without departing from the spirit and scope of the invention.

I claim:

1. A threaded fastener comprising an elongated shank having a torque receiving means at one end and thread forming means at the other end for forming internal threads of a predetermined shape in the wall of a previously formed hole, said shank having a fastening section with external threads adjacent said torque receiving means, said external threads being continuous and having substantially the same pitch as the pitch of the thread forming means and being of a thread form different from but adapted to mate with the internal threads formed by the thread forming means, said shank having a longitudinal axis and said thread forming means and external threads being coaxial therewith, said shank having a reduced diameter portion defining an empty annular space around the shank in said hole and also defining a thread forming torque transmission connection section between said external threads and said thread forming means which is the minimum cross section and weakest part of said shank with respect to axial tension therein whereby elongation under tension occurs primarily in the connection section and said section is more susceptible to fracture under tensile load than the other sections, said thread forming means being shaped to form internal threads with wedge ramps at the roots thereof and said external threads having crests that engage said ramps and move down the ramps as axial load on the shank increases.

2. A fastener as set forth in claim 1 wherein said connection section is unthreaded and of less diameter than the root diameters of said thread forming means and said external threads.

3. A fastener as set forth in claim 2 wherein said torque receiving means comprises a head with substantially flat sides.

4. A fastener as set forth in claim 1 wherein the connection section has a length substantially equal to np+s where "n" is an integer, "p" is said pitch, and "s" is short length materially less than the projected axial length of said wedge ramp.

5. A fastener as set forth in claim 4 wherein "s" is about 5-10% of "p".

6. A fastener as set forth in claim 5 wherein "n" is 3.

7. A fastener as set forth in claim 4 wherein said connection section is unthreaded and has a diameter substantially less than the root diameters of said external threads and thread forming means and said empty annular space around said section provides a chip collection space adapted to collect chips formed during threading.

8. A fastener as set forth in claim 7 wherein "s" is about 5-10% of "p".

9. A fastener as set forth in claim 8 wherein said torque receiving means comprises an enlarged head on the shank.

10. A fastener as set forth in claim 4 wherein "s" is about 10-20% of said projected axial length.

11. A fastener as set forth in claim 1 wherein said thread forming means is shaped to swage internal threads.

12. A fastener as set forth in claim 2 wherein said thread forming means comprises a thread cutting means.

* * * * *